Patented Oct. 4, 1932

1,881,303

UNITED STATES PATENT OFFICE

LUDWIG WEISS, OF FRANKFORT-ON-THE-MAIN, GERMANY

PROCESS FOR THE MANUFACTURE OF OPACIFIERS

No Drawing. Application filed December 25, 1928, Serial No. 328,325, and in Germany December 27, 1927.

The invention relates to opacifiers used in the manufacture of enamels and the like. Zirconium oxide has been suggested for use as opacifier for enamels imparting to the latter a desirable white colour. When using zirconium oxide, however, it has been found that this substance does not possess by a long way the same opacifying power as tin oxide and that it is comparatively easily dissolved in the enamel melt and thereby vitrified. Various methods have been tried to overcome this disadvantage. For instance, certain admixtures such as alkali hydrates or water and silica have been added to the material, but without success.

I have now succeeded in solving the problem by converting the zirconium oxide into a form which is soluble with difficulty only or practically insoluble in the enamel melt. Thorough investigations have shown that zirconium oxide which is nearly insoluble in the enamel melt can be produced by heating zirconium oxide produced in any way to high temperatures which generally are above 1000° centigrade. Especially good results were obtained by heating the zirconium oxide to temperatures above 1200° centigrade such as 1200 to 1500° C. or more.

I have found that zirconium oxide which has been treated in this way, e. g. heated for example to from 1200° to 1400° centigrade is superior even to tin oxide as far as its opacifying capacity and resistance against the action of the melt is concerned. In the same way as the opacifying power of the zirconium oxide is enhanced by the treatment the resistance of the oxide against the obnoxious effect of overheating or, what comes to the same, of being heated for too long a time is in general increased also.

Further, I have found that zirconium oxide from various sources can be improved in accordance with my invention by heating to a suitable temperature and that its suitability for the application as opacifier is considerably increased I do not advise to treat zirconium oxide which contains inconvenient quantities of alkaline admixtures as these may give rise to undesirable sintering.

When I heat zirconium oxide to the temperatures to be applied in accordance to my invention, e. g. to 1000° centigrade and more I can do it either during its manufacture or immediately afterwards. Thus, for instance, the zirconium oxide may be produced at temperatures most suitable for its production and then the temperature may be increased to the degree best suited for the present purpose.

It is known that zirconium oxide can be prepared directly by heating for instance zirconium sulfate, zirconium oxichloride, zirconium nitrate, zirconium hydroxide or organic salts of zirconium. For this method of producing zirconium oxide, however, moderate temperatures of 250° to 400° centigrade are sufficient (see, for instance, Gmelin-Kraut, 7th Ed., vol. 6, p. 677). Zirconium oxide produced in this way and heated to a moderate temperature only is as I have ascertained through numerous experiments very easily soluble in enamel melts. These observations coincide completely with the opinions held by experienced and skilled ceramists which state that zirconium oxide has not the opacifying capacity of the well known opacifier stannic oxide.

Zirconium oxide may be heated according to my invention without any special precautions, for instance by heating it in suitable furnaces to the required temperatures in the shape of powder.

Furthermore I have found that other substances which are applicable as opacifiers can be improved considerably by heating them to high temperatures which usually are those above 1000° centigrade. Such compounds are, for instance, zirconium phosphate, certain zirconium silicates, for instance basic zirconium silicates, zirconium fluorine compounds, further titanic acid and its compounds, for example, titanium oxide, also compounds of antimony, which may be used as opacifiers such as, for instance, sodium meta antimoniate.

What I claim is:

1. A process for the manufacture of a zirconium oxide enamel opacifier in which the opacifying effect of the oxide is increased, comprising the steps of heating an oxygen containing salt of zirconium and decomposing it into the oxide at a relatively low temperature, then heating the resulting oxide to temperatures exceeding 1000° C. but below the melting point of zirconium oxide, in order to increase the opacifying effect of the zirconium oxide obtained as a result of the first heating.

2. A process for the manufacture of a zirconium oxide enamel opacifier in which the opacifying effect of the oxide is increased, comprising heating an oxygen containing salt of zirconium and decomposing it into the oxide at a relatively low temperature, then heating the resulting oxide to a temperature within the range of 1200° C. to 1500° C., whereby the opacifying ability of the zirconium oxide is increased.

Signed at Frankfort-on-the-Main, in the county of Hessen-Nassau and State of Prussia, Germany, this tenth day of December, A. D. 1928.

LUDWIG WEISS.